United States Patent
Li et al.

(10) Patent No.: US 8,230,262 B2
(45) Date of Patent: Jul. 24, 2012

(54) METHOD AND APPARATUS FOR DEALING WITH ACCUMULATIVE BEHAVIOR OF SOME SYSTEM OBSERVATIONS IN A TIME SERIES FOR BAYESIAN INFERENCE WITH A STATIC BAYESIAN NETWORK MODEL

(75) Inventors: Fulu Li, Foster City, CA (US); Mohsin Beg, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 12/830,175

(22) Filed: Jul. 2, 2010

(65) Prior Publication Data
US 2012/0005534 A1 Jan. 5, 2012

(51) Int. Cl.
*G06F 11/00* (2006.01)
(52) U.S. Cl. .......................... 714/26; 714/39
(58) Field of Classification Search .................. 714/26, 714/25, 37, 39, 40, 1
See application file for complete search history.

(56) References Cited

U.S. PATENT DOCUMENTS

| | | | |
|---|---|---|---|
| 5,561,760 A | 10/1996 | Ferris et al. | |
| 6,076,083 A | 6/2000 | Baker | |
| 6,289,357 B1 | 9/2001 | Parker | |
| 6,456,622 B1 | 9/2002 | Skaanning et al. | |
| 6,594,744 B1 | 7/2003 | Humlicek et al. | |
| 7,457,796 B2 | 11/2008 | Lashley et al. | |
| 7,539,710 B1 | 5/2009 | Haustein et al. | |
| 7,567,188 B1 | 7/2009 | Anglin et al. | |
| 7,577,099 B1 | 8/2009 | Greenberg et al. | |
| 2001/0011260 A1 | 8/2001 | Skaanning et al. | |
| 2002/0019870 A1 | 2/2002 | Chirashnya et al. | |
| 2003/0126501 A1* | 7/2003 | Musman | 714/26 |
| 2005/0015667 A1 | 1/2005 | Aaron | |
| 2005/0028033 A1 | 2/2005 | Kipersztok et al. | |
| 2005/0091012 A1 | 4/2005 | Przytula et al. | |
| 2005/0283451 A1 | 12/2005 | Abrashkevich et al. | |
| 2006/0020866 A1 | 1/2006 | Lo et al. | |
| 2006/0085689 A1* | 4/2006 | Bjorsne | 714/39 |
| 2006/0101308 A1 | 5/2006 | Agarwal et al. | |
| 2006/0161819 A1 | 7/2006 | Nissan-Messing et al. | |
| 2008/0010522 A1 | 1/2008 | Uwatoko et al. | |

(Continued)

OTHER PUBLICATIONS

Aronovich et al., "The Design of a Similarity Based Deduplication System", SYSTOR, 2009, 14 pages.
Forman et al., "Efficient Detection of Large-Scale Redundancy in Enterprise File Systems", 8 pages, Jan. 2009.

(Continued)

*Primary Examiner* — Dieu-Minh Le
(74) *Attorney, Agent, or Firm* — Hickman Palermo Truong Becker Bingham Wong LLP

(57) ABSTRACT

A method and apparatus are provided for determining the probability that one or more problems have occurred within a complex multi-host system. A probabilistic model representing the cause/effect relationships among potential system problems identifies the probability that a problem occurred in the system based at least on system measure states that are input into the probabilistic model. System measure states may be determined based on an aggregation of system measurement values taken periodically. Aggregating system measurement values may be performed over system measurement values that were taken during a recent time interval. A rolling count aggregation function may be used for this purpose. A rolling count function counts the number of system measurement values taken within the recent time interval that lie within a particular range of values. A system measure state may be determined based on whether the rolling count exceeds a threshold associated with the system measure.

15 Claims, 15 Drawing Sheets

U.S. PATENT DOCUMENTS

| | | | |
|---|---|---|---|
| 2008/0039993 | A1 | 2/2008 | Cleary et al. |
| 2008/0098083 | A1 | 4/2008 | Shergill et al. |
| 2008/0235291 | A1 | 9/2008 | Lahiri et al. |
| 2009/0018996 | A1* | 1/2009 | Hunt et al. .................. 707/2 |
| 2009/0024356 | A1* | 1/2009 | Platt et al. ................ 702/181 |
| 2009/0292948 | A1* | 11/2009 | Cinato et al. ............... 714/26 |
| 2010/0094817 | A1 | 4/2010 | Ben-Shaul et al. |
| 2010/0121825 | A1 | 5/2010 | Bates et al. |
| 2012/0005532 | A1 | 1/2012 | Li et al. |
| 2012/0005533 | A1 | 1/2012 | Li et al. |

OTHER PUBLICATIONS

U.S. Appl. No. 12/830,069, filed Jul. 2, 2010, Notice of Allowance, Correspondence Mailing Date Jul. 7, 2011.

U.S. Appl. No. 12/830,116, filed Jul. 2, 2010, Notice of Allowance, Correspondence Mailing Date Jul. 28, 2011.

U.S. Appl. No. 12/830,116, filed Jul. 2, 2010, Notice of Allowance, mailing date Dec. 1, 2011.

U.S. Appl. No. 12/830,144, filed Jul. 2, 2010.

* cited by examiner

METHOD AND APPARATUS FOR DEALING WITH ACCUMULATIVE BEHAVIOR OF SOME SYSTEM OBSERVATIONS IN A TIME SERIES FOR BAYESIAN INFERENCE WITH A STATIC BAYESIAN NETWORK MODEL

CROSS-REFERENCE TO RELATED APPLICATIONS

This application is related to U.S. patent application Ser. No. 12/830,069 filed Jul. 2, 2010, U.S. patent application Ser. No. 12/830,144 filed Jul. 2, 2010, and U.S. patent application Ser. No. 12/830,116 filed Jul. 2, 2010, the entire contents of which are hereby incorporated by reference for all purposes as if fully set forth herein.

FIELD OF THE INVENTION

The present invention relates to root cause diagnosis of faults in a complex, multi-host system.

BACKGROUND

Multi-Host Computing System

A multi-host computing system is a collection of interconnected computing elements that provide processing to a set of client applications. Each of the computing elements may be referred to as a node or a host. (The word "host" is used herein to avoid confusion with "nodes" of a graph). A host may be a computer interconnected to other computers, or a server blade interconnected to other server blades in a grid. A group of hosts in a multi-host computing system that have shared access to storage (e.g., have shared disk access to a set of disk drives or non-volatile storage) and that are connected via interconnects may be referred to as a cluster.

FIG. 1 shows a diagram of an example multi-host computing system that includes four hosts 110a, 110b, 110c, and 110d. These hosts may communicate with each other via the Network 130. The hosts access Disk Bank 140 through the network. Disk Bank 140 includes disks that may provide Swap Space 142. A host, such as Host 110a, includes at least a Processor (CPU) 114 and Memory 112. At least part of an Operating System Kernel 116 may reside in Memory 112 and implement system and user processes 118. A process may be a running instance of software, for example, a process that runs database management software.

A multi-host computing system may be used to host clustered servers. A server is combination of integrated software components and an allocation of computational resources, such as memory, a host, and processes on the host for executing the integrated software components on a processor, where the combination of the software and computational resources are dedicated to providing a particular type of function on behalf of clients of the server. An example of a server is a database server. Among other functions of database management, a database server governs and facilitates access to a particular database, processing requests by clients to access the database.

Resources from multiple hosts in a cluster can be allocated to running a server's software. Each allocation of the resources of a particular host for the server is referred to herein as a "server instance" or instance. A database server can be clustered, where the server instances may be collectively referred to as a cluster. Each instance of a database server facilitates access to the same database, in which the integrity of the data is managed by a global lock manager.

Each host of cluster is comprised of multiple components that are interdependent for the purpose of performing the work of the cluster. In addition, hosts in a cluster cooperate with each other to perform global functions such as time synchronization, lock management, and file system management. Thus, a failure in one component on one host may adversely affect other components on that host from carrying out their function and/or may adversely affect another host's ability to carry out its work within the cluster.

Root Cause Diagnosis

As can be seen from the description above, multi-host systems may be very complex with interdependencies among multiple hardware and software components. When the system fails, it may be difficult to determine the root cause of the failure. From a set of observations about the system, the cause of a problem may be determined so that the underlying cause may be fixed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

FIG. 8A shows the steps for determining the root cause, and FIG. 8B shows the steps for generating a fault cause path.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Diagnosing faults in complex systems may be challenging for at least several reasons. With multiple components performing asynchronously, it may be difficult to know at any one point in time whether observed anomalous system measurements represent a real fault condition or just a transient condition that will correct itself without intervention. False positive indications of failure can occur because a large complex system has oscillating states. It would be too expensive to respond to every transient failure condition. Thus, it is important to compress the variations that occur over short periods of time to get a better understanding of the cumulative system state. Also, diagnosing faults in complex systems may be challenging due to the complex interrelationships among components. The cause of one problem may be the symptom of a more fundamental problem. Knowing the ultimate source of a failure is crucial to identifying the failed component and fixing the failed component properly.

Figure 1:
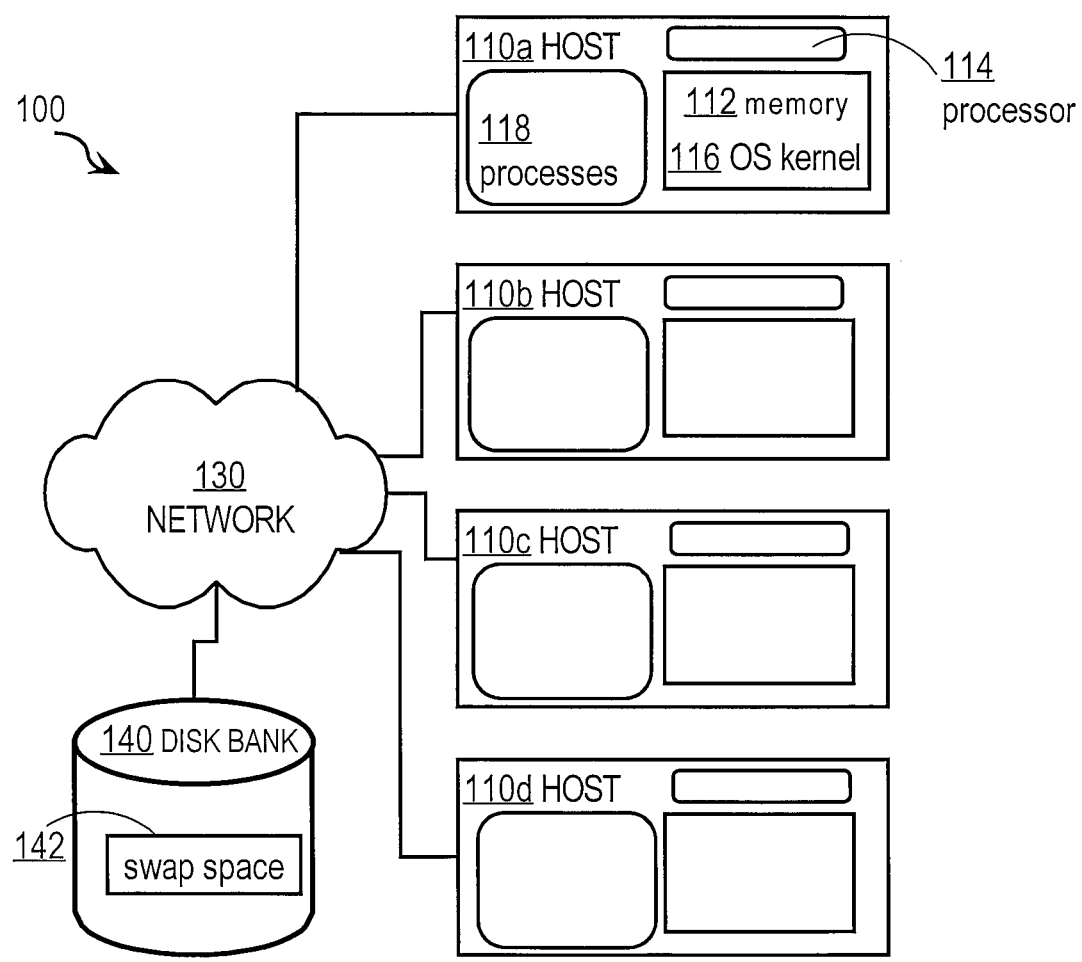
FIG. 1 is a block diagram of a multi-host system according to an embodiment of the invention.
Figure 2:
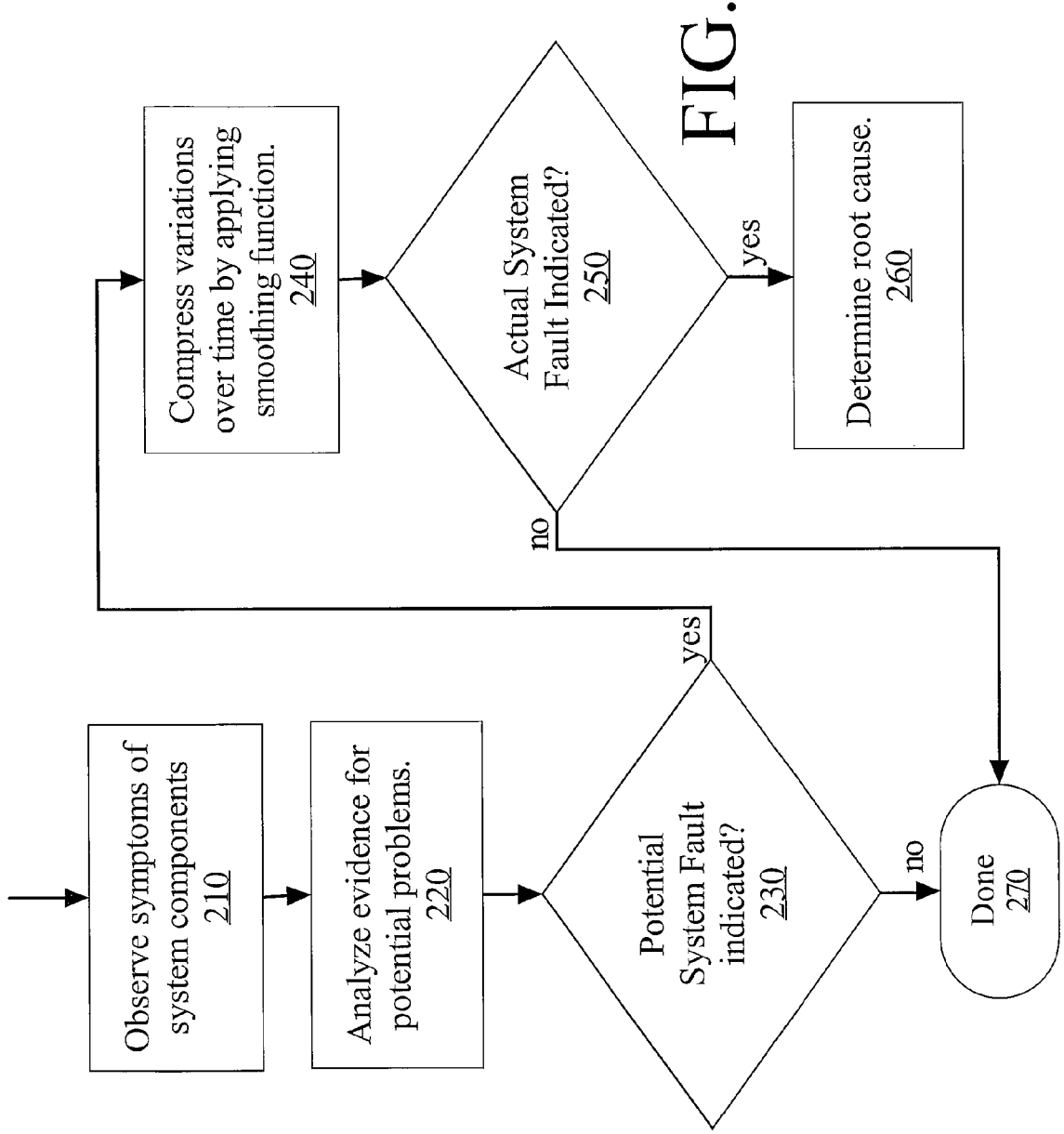
FIG. 2 is a flowchart illustrating the high level steps for determining one or more causes of a system fault in a multi-host system in accordance with an embodiment of the present invention.

FIG. 2 is a flow diagram that shows a high-level overview of the technique described herein. The entire flow is performed at successive points in time, for example in an embodiment, the flow may be performed once every second. At Step 210, system measurements are gathered from the system components and may be aggregated in the context of historical data to dampen the effect of anomalous variations. Each aggregated measurement (also referred to as an "observation") may provide evidence of one or more system failures. In Step 220, the measurements gathered within the current time period are analyzed. A probability of a failure is determined for each system component. In addition, the probability of an overall system failure may be calculated and analyzed to determine whether the evidence gathered in this time period indicates a potential system problem. If there is no evidence of a problem based on the probability of an overall system failure in Step 230, then it is determined that the flow is complete for this time period (Step 270). If there is evidence of a potential problem, then the flow continues to Step 240 where the current evidence is analyzed in the context of historical data to determine whether or not the cumulative data indicates that there is a problem requiring intervention. A smoothing function is used to perform the analysis in historical context. In Step 250, if the results in Step 240 indicate a transient anomaly, there is nothing more to do in this time period (Step 270). If the results from Step 240 indicate that the potential problem is determined to be an actual system fault, thus requiring attention, then in Step 260 a root cause analysis is performed to understand the source of the problem.

The techniques described herein can be used for diagnosis in a complex multi-host system or in a single host system. The techniques may be used in real-time for continuous monitoring and reporting of faults as they occur in a running system. Alternatively, the diagnostic system can be enabled on demand at the time a problem is suspected. In that way, system resources are not spent diagnosing problems when there is no observable problem, but the ongoing recorded system measurements can be used when they are needed. Also, if a host crashes or restarts without warning, the diagnostic system may be used to analyze data stored before the crash to conduct a post-mortem to determine the cause of the crash/restart.

Diagnostic System

Components and Terminology

Figure 3:
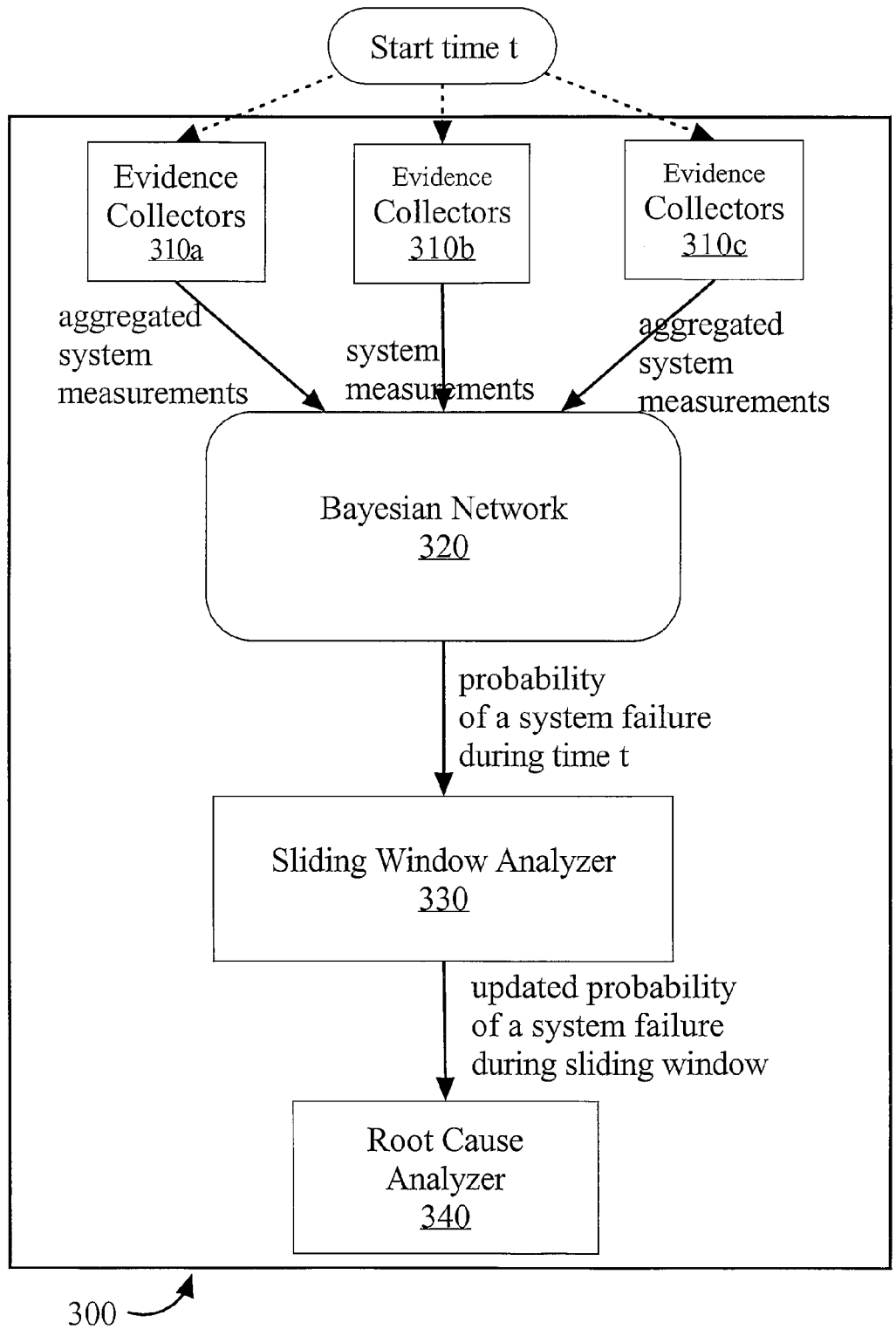
FIG. 3 is a block diagram of logical components in an example environment in which the systems and methods discussed herein may be implemented.

The approach described herein relies on combining two techniques: a probabilistic cause/effect model and the use of a historical time window over which inputs to and outputs from the probabilistic model may be interpreted. A probabilistic model is used to represent the interrelationships among components regarding how a failure in one component may affect another component, and a historical time window may be used to identify recently collected data points used as input to an aggregation function that produces data that better reflects the cumulative state of the data over recent history. FIG. 3 shows the flow of data through logical components in an embodiment of the failure analysis system 300. The failure analysis system as shown in FIG. 3 includes one or more Evidence Collectors (310a, 310b, 310c), a Bayesian Network 320, a Sliding Window Analyzer 330, and a Root Cause Analyzer 340.

One or more Evidence Collectors (310a-c) collect one or more system measurements and provide information into the Bayesian network. Each Evidence Collector performs step 210 shown in FIG. 2. Evidence Collectors (310a-c), sometimes referred to as agents, collect system measurements from components of the system and aggregate individual measurements using historical context.

The term measurement or measurement value as used herein does not distinguish between a value that is collected through direct observation and one that is computed based on more than one observed measurements. For example, a "percent utilization of memory" measurement requires values for both "the amount of memory in the system" and "the amount of memory currently in use" or "the amount of memory currently free." The unit of measure of the collected value is referred to as a system measure, and the data values collected are interchangeably referred to as measurements, system measurements, system measurement values, or measurement values. "Taking" a measurement is used synonymously with collecting or computing system measurement values.

The term "real" failure or "actual" failure is used herein to mean that a detected problem requires intervention to resolve. A "transient" problem is one that will be resolved on its own without intervention, and thus, a transient problem is not a real or actual problem. In addition, the terms "failure," "fault," and "problem" are used interchangeably.

The Evidence Collectors provide the collected data into the Bayesian network. The Bayesian Network 320 is a model for determining the probability of failures in each component as well as for determining an overall system failure given the probability of failure of each of the components that may cause a system failure. Each measurement value corresponds to a point in time when the measurement was taken, referred to herein as a "measurement time point." A "measurement time interval" is comprised of the set of measurement values that were taken at measurement time points corresponding to a set of successive measurement time points in recent history.

A Bayesian Network is a probabilistic model that represents a system of probabilistic events as nodes in a directed acyclic graph (DAG). In the approach described herein, the Bayesian network is adapted to specify the knowledge of the causes and effects of system component failures on each other and on the system as a whole for the purpose of detecting and diagnosing root causes of observed failures. Nodes of the graph represent problems or sub-problems of the system or observed system states, and the connections (directional links) between nodes represent the probability of a cause/effect relationship between the problems represented by the two nodes in the graph. Given symptoms, the network can be used to compute the probabilities of various system problems/sub-problems.

The Bayesian Network 320 as used in the technique described herein comprises several different kinds of nodes. An observation node takes measurements from the Evidence Collectors and maps a measurement to a measurement state. The measurement state is provided to one or more fault nodes as input. A fault node represents a failure in the system. A fault node takes one or more measurement states and computes the probability of the failure that is represented by the fault node in the network. For example, a fault node "Out of Memory" represents a failure state in which the system is out of memory and computes the probability that the system is out of memory. The failure represented by a first fault node may cause another failure represented by a second fault node. When two fault nodes have this relationship, there is a directed link in the graph from the first fault node to the second fault node. A root cause node is a fault node that represents a potential root cause of problems in the system. A root cause node has no link from another fault node directed to it in the graph because there is no failure for which a root cause node represents the effect/symptom of the failure. The term "symptom node" is used herein to refer to a fault node representing a problem selected for diagnosis.

The terminology needed to describe the association of failures in the system with the nodes that represent those failures in the model can be cumbersome. Thus, a short hand terminology is used herein. "A failure represented by a fault node may cause another failure in the system represented by another node" may be abbreviated to "one fault node causing another fault node" even though nodes in a Bayesian network don't literally "cause" each other. Likewise, "the probability of failure corresponding to a failure represented by a fault node" may be abbreviated to "the probability of failure {of, for, corresponding to, associated with} a fault node." In addition, a directional link that points from a first node in the DAG directly to a second node in the DAG is said to be an "outbound link" with respect to the first node and an "inbound link" with respect to the second node. A node "has a link" if there is a directional link in the DAG with respect to the node.

In an embodiment, the Bayesian Network is used to perform Step 220 in FIG. 2. The output from the Bayesian Network 320 determines the probability that the evidence collected in the current time period indicates that a system failure occurred somewhere within the system, and thus determines whether further investigation is required. In addition, the model also outputs a probability of failure for every fault node.

The probability of failure that is generated for each fault node is added to the fault node's respective sliding time window, and the Sliding Window Analyzer 330 may use historical data in the window to determine the likelihood that a real problem corresponding to that fault node should be diagnosed or whether more evidence is needed before acting on the current data. The Sliding Window Analyzer 330 performs step 240 in FIG. 2.

Each probability of failure value corresponds to a point in time when the probability of failure for each fault node of the Bayesian network is computed, referred to herein as a "probability time point." A "probability time interval" is comprised of the set of probability of failure values that were computed at probability time points corresponding to a set of successive probability time points in recent history.

If after analyzing the current evidence in the context of historical data the system determines that it is highly probable that a real failure has occurred, then the Root Cause Analyzer 340 performs step 260 by extracting data from the Bayesian Network to determine the fault cause path. The fault cause path is comprised of a series of cause→effect steps starting with the root cause and ending at the failure associated with the symptom node being diagnosed. For example, a fault cause path might look like:

"available free memory very low→memory problem→system failure."

The following sections describe components of the diagnostic system in more detail.

Evidence Collectors

Observable states of many system measurement values are collected periodically over time. Examples of system components whose state may be observed includes hardware components such as memory, CPU, and networks as well as software components such as operating systems, applications, processes, and sessions. States represented may include absolute utilization, relative utilization (e.g. a percentage), or rates such as network throughput, bandwidth, or transactions processed per second. System measurements for one system measure may be taken asynchronously from other system measures. However, all system measurements are taken periodically over time.

Figure 4:
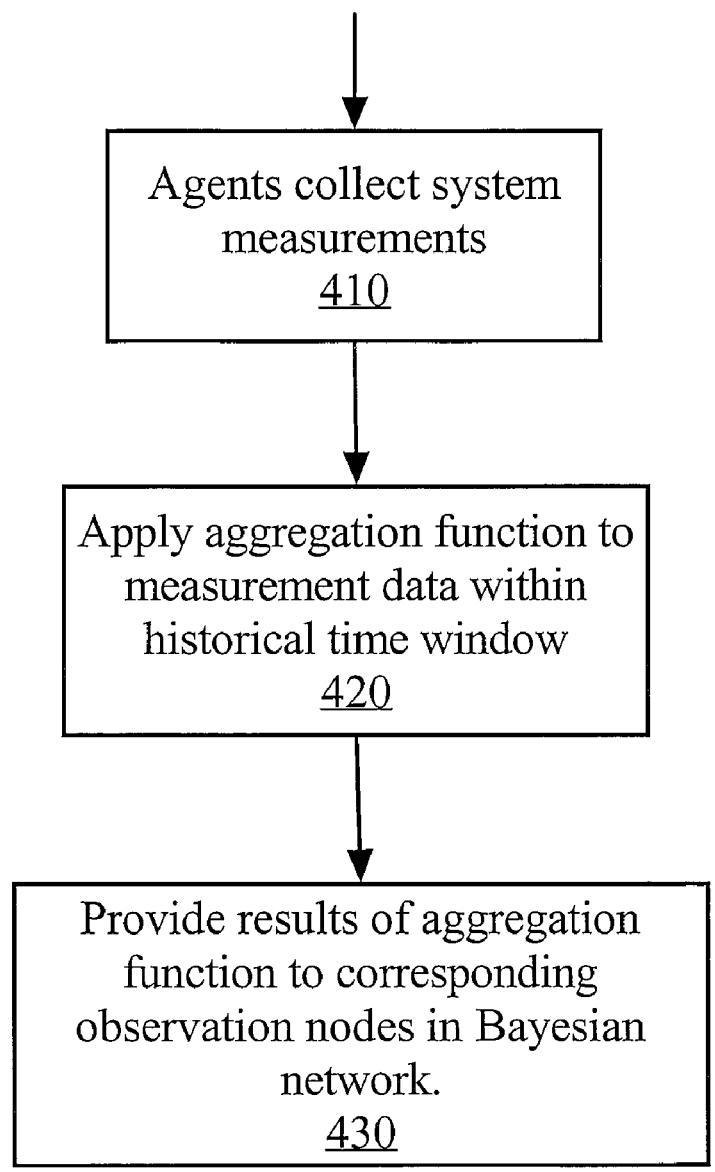
FIG. 4 is a flow diagram showing the steps performed by an Evidence Collector according to an embodiment of the invention.

FIG. 4 is a flow diagram that shows the steps performed by an Evidence Collector 310a-c for one time period. Step 410 is performed by one or more agents to collect data from various system components. Examples of data collected may include the amount of memory installed in the system, the amount of memory in use, the percentage of CPU utilization, CPU queue length, the network bandwidth available to the system, the network utilization, etc. The measurements collected in Step 410 may be directly observed, reported by another component such as an operating system kernel or management station, or computed based on other collected data. For example, "the number of pages of real memory in use" is an example system measurement that is based on data collected from an operating system about the memory component, and the "percentage of memory utilization" is a system measurement that is computed based on the total amount of memory installed and the amount of memory in use.

In Step 420, an aggregation function may be applied to the measurement collected in the current time period together with the measurements taken at time points during a recent time interval. The aggregation function may use all or some of the values in the current historical time window and returns a single value which is used in Step 430 to provide input to an observation node of the Bayesian network. Each system measurement may have an associated, configurable window size. That is, not all system measurements are required to be aggregated over the same historical time period. However, each historical window may have a fixed size, so that when a new measurement is taken, the oldest measurement in the window is removed from the window. This may be called, "sliding the window" or "rolling the data through the window." Furthermore, the aggregation function is not required to output an aggregated measurement for every time period in which a measurement is collected. In an embodiment, measurements may be collected more frequently than aggregated values are input into observation nodes of the Bayesian network.

The nature of the aggregation function may be different depending on each kind of system measure. For example, for some system measures, the data value of the measurement is not as important as the trend of the values or the frequency of an anomalous value within the historical window. For other measurements, the value itself may be important, but it may be beneficial to smooth out individual data points to avoid troubleshooting a transient problem.

In an embodiment, the aggregation function may be a moving average. The moving average may have the effect of smoothing outlying values that are not necessarily attributed to failures in the system. In this embodiment, the data values within the historical window are averaged, and the average measurement value is provided to an observation node in the Bayesian Network.

In an alternative embodiment, the current measurement may be used without being subject to aggregation.

Using a Rolling Count Aggregation Function

Figure 5:
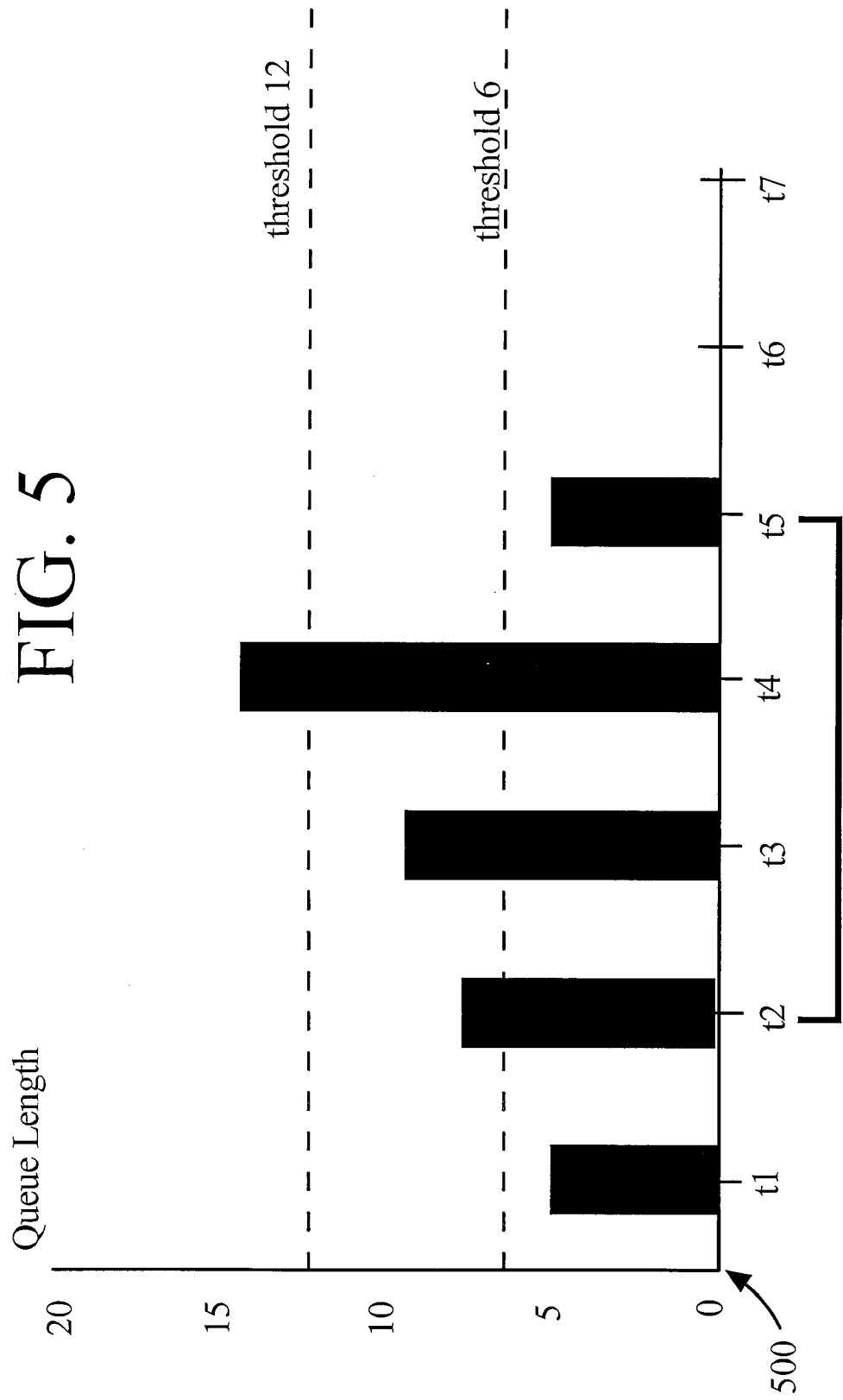
FIG. 5 shows an example rolling count window for a CPU queue length measurement according to an embodiment.

In another embodiment, a rolling count may be used as an aggregation function to count the number of measurements that lie within a threshold range in the historical window. FIG. 5 shows an example of measurements of CPU queue length in a historical window. At time period t5, the example in FIG. 5 shows the historical window containing measurements for time periods t2, t3, t4, and t5. One queue length threshold is 6 and another queue length threshold is 12. Thus, the number of occurrences, or frequency of measurements, is counted within the historical window for which there are values in the following ranges: {0-5} {6-11} {>=12}. The measurement value at t5 is the only value that falls in the range of {0-5}. The measurement values at t2 and t3 fall between 6 and 12, and the measurement value at t4 is the only measurement that exceeds 12. Thus, for a rolling count aggregation function associated with the range of values {0-5}, the return value is 1. The value returned by the rolling count aggregation function associated with {6-11} is 2, and the rolling count aggregation function associated with values 12 or greater returns 1. The output from each rolling count aggregation function may provide input into the same or different observation nodes.

Bayesian Network

Figure 6:
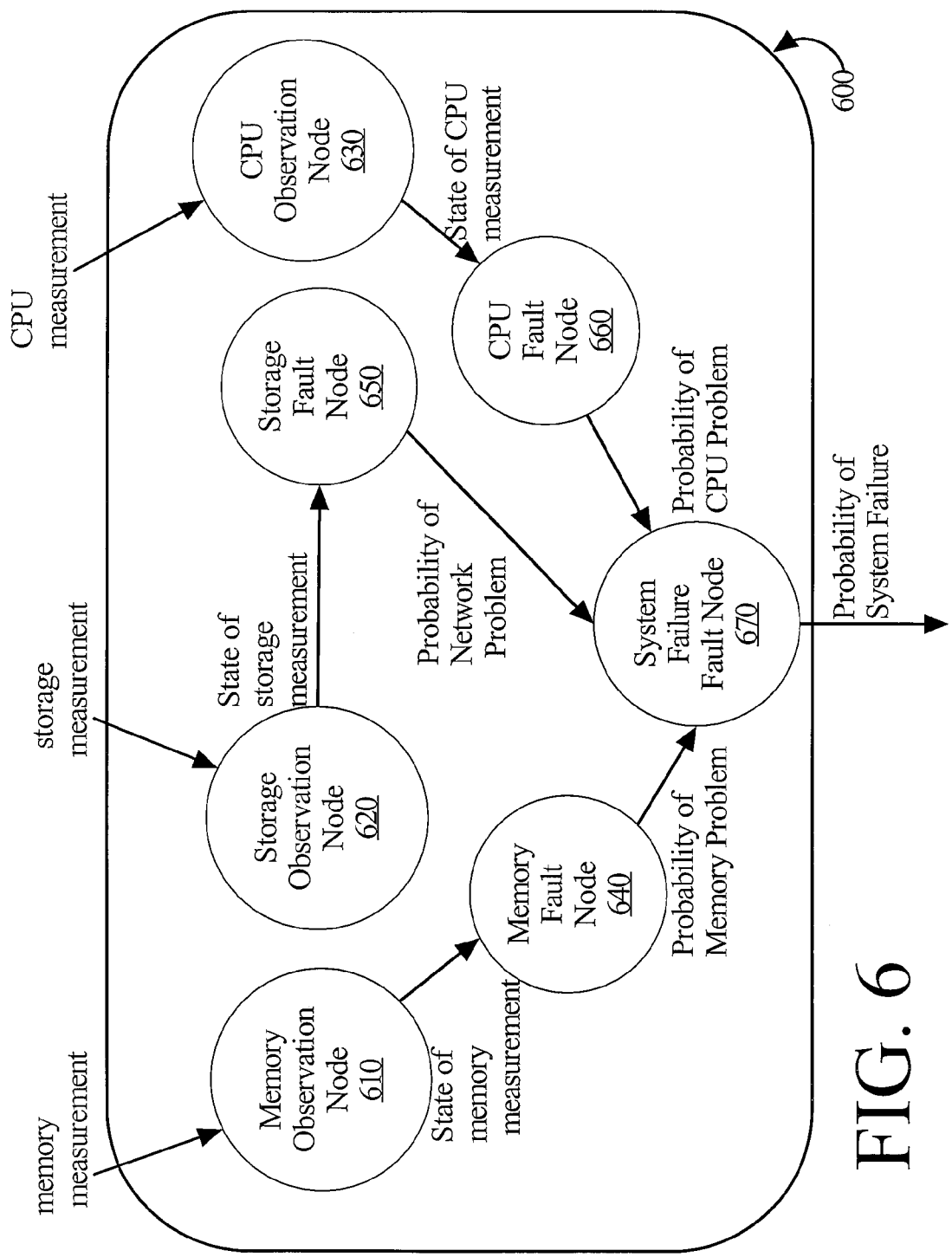
FIG. 6 illustrates a graph representing the relationship among subproblems, problems, and system failures in accordance with an embodiment of the present invention.

FIG. 6 shows a simplified example of a Bayesian network 600 to explain the role and relationships of the different kinds of nodes in the network. A Bayesian network would likely be much more complex with many more nodes and interrelationships among nodes. Observation Nodes 610, 620, and 630 represent the observed states of system measurements pertaining to memory, storage, and CPU respectively. An observation node takes as input a system measurement that may or may not be aggregated and determines a state corresponding to that measurement. In an embodiment of the invention, an observation node may use a table of values to map a measurement into a measurement state. Table 1 below shows an example of determining a measurement state for a free memory system measurement:

TABLE 1

Measurement States for Free Memory Measurement

| MB of free memory | State of free memory |
| --- | --- |
| <100 | 0 |
| 100-500 | 1 |
| 500-1000 | 2 |
| >1000 | 3 |

Based on this example, if there is 600 MB of free memory available, then the measurement state for free memory is mapped to state 2, because state 2 corresponds to the range of free memory [500-100 MB] which is the range in the table that includes 600 MB. The state of a measurement is provided as input into one or more fault nodes in the Bayesian network. For example, the state of memory measurement is input into memory fault node 640. Similarly, the example in FIG. 6 shows a storage measurement mapped to a state of storage measurement by Storage Observation Node 620, and the state of storage measurement provided to the Storage Fault Node 650 as input. Likewise, a CPU measurement is shown as input into the CPU Observation node 630 where the output state of CPU measurement is provided to the CPU Fault Node 660.

Each system state measure may have a natural language representation for use in explaining the fault to a user. Memory Fault Node 640 represents the probability that there is a failure in the memory component. The input from one or more observation nodes such as "low swap space," "low free space", "percentage memory utilization too high" are used to determine the overall probability that one or more specific memory problems exists. The Storage Fault Node 650 and CPU Fault Node 660 work similarly. System Failure Node 670 takes as input the probabilities of failures in memory, storage, and CPU and computes the probability of an overall system failure. Memory Fault Node 640, Storage Fault Node 650, and CPU Fault Node 660 are each fault nodes that are not caused by other failures represented by other fault nodes. Thus, each of fault nodes 640, 650, and 660 are root cause nodes.

System Failure Node 670 represents the overall health of the system. When the System Failure Node 670 indicates a probability of system failure that exceeds a threshold, it may be necessary to form a diagnosis of the system. The System Failure Node 670 is not a root cause node because it can be caused by fault nodes 640, 650, or 630.

The techniques described herein use a Bayesian Network that is already defined to describe the interrelationships among system components.

Time Sliding Analysis Window

A time series is a sequence of data points, corresponding to successive measurement of system states that are measured typically at successive times spaced at uniform or non-uniform time intervals. A time window refers to a time span that consists of a fixed number of successive time points in a time series. As each measurement is collected and added to the stream of measurements, the time window slides to include the new measurement as the most recent value in the window, and the oldest value is removed from the window so that the number of data points in the window is preserved.

The probability of a system failure as determined in the Bayesian network is compared to a failure threshold value defined for the system failure probability. In an embodiment, if the probability of system failure does not exceed the threshold, no further analysis is needed at the current time. If the probability of a system failure exceeds the threshold value, then the sliding window at the current time is identified as a candidate fault window. A candidate fault window is a time period during which the probability of an overall system failure is high enough to warrant further investigation.

In an embodiment, the system may be analyzed for root causes any time there is a candidate window, though there may be low confidence in the explanations produced when the candidate window is not first analyzed to verify that an actual failure occurred. In another embodiment, the system is not analyzed for root causes until a candidate fault window is determined to represent an actual, real failure. When a candidate fault window is identified, a sliding window analysis may be performed to determine whether the failure is likely to be a transient error that will correct itself without intervention or whether it is likely that an actual failure has occurred. If a transient error is suspected, it may not be necessary to expend resources to perform root cause analysis and respond to error indications produced with low confidence.

To determine the likelihood that an actual fault occurred in the system, the sliding window looks back in history over a window of time to see whether the probability of failure at the current time is an anomaly, continues an historical trend, or is consistent with past behavior. In any case, a smoothing function may be performed on the probability values recorded during the historical time window. The smoothing function is a kind of aggregation function that takes some or all of the probability data points in a particular historical time window and generates a new smoothed probability value that better represents the cumulative probability of failure over recent history.

Figure 7:
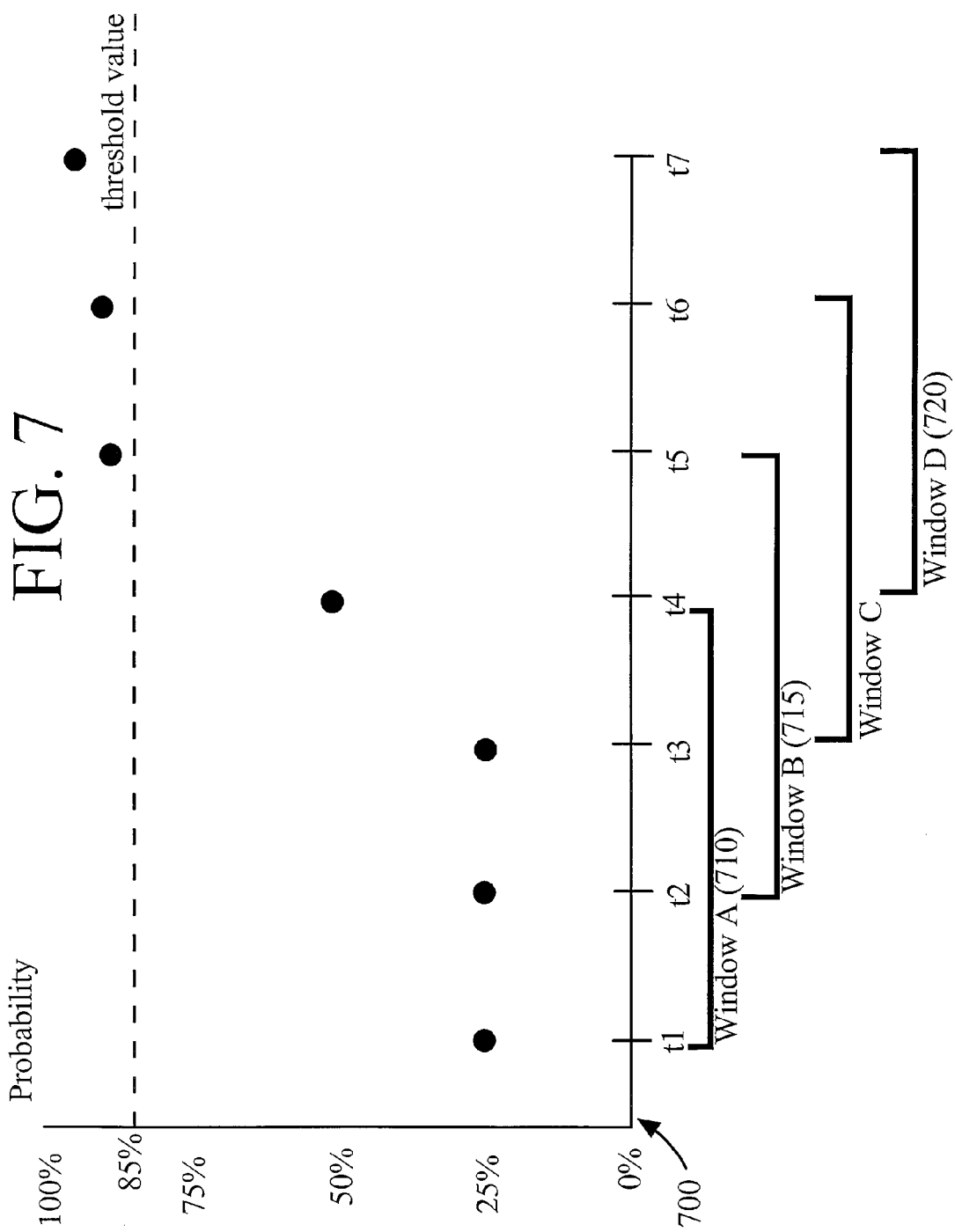
FIG. 7 is a diagram illustrating a sliding time window over which system measurements are aggregated in accordance with an embodiment of the present invention.

FIG. 7 shows a diagram of the time sliding window. Sliding window 700 shows the probability of system failure values during time periods t1 through t7. As an example, if the threshold value for determining a candidate fault window is 85%, then the probabilities of failure observed at times t1, t2, t3, and t4 do not identify candidate fault windows. However, each probability of failure observed at times t5, t6, and t7 exceeds 85%, and thus identifies a candidate fault window.

In this example, the length of the window includes four time points, but in an embodiment, the length of the window may be configurable. Window B 715 is the window of time from t2 to t5. At time t5, which is identified to be a candidate fault window, the probabilities within Window B 715 are used to determine whether t5 is an actual fault window. In an embodiment, the number of time periods when the probability of failure has exceeded the failure threshold value is counted and compared to a threshold count value. The fault count for Window B 715 is 1. If the threshold count value is set to 3, then the fault count for Window B 715 does not exceed the threshold, and thus is not considered an actual fault window. However, Window D, which is also a candidate fault window, is an actual fault window because its fault count is 3, which is equal to the threshold fault count value.

Using a fault count over historical probabilities of failure is similar to the technique described as the rolling count for individual system measurements above. In other embodiments, other aggregation functions may be used such as a first order differential or a moving average over all of the probabilities in the window. In embodiments that use these aggregation functions, a new probability may be computed and compared to the same fault node probability threshold value that was used to identify a candidate fault window. In the example shown in FIG. 7, if a moving average were used, a new probability for Window A 710 would be computed as (25%+25%+25%+50%)/4=41%, and 41% is less than the threshold value of 85%. Thus, using a moving average in this way, Window A 710 would not be considered an actual fault window.

As mentioned earlier, the aggregate probability value is compared to a probability threshold value to determine whether the current time represents an actual fault window. When an actual fault window is identified, root cause analysis is performed to determine the cause of the system failure.

Root Cause Analysis within a Host System

Root cause analysis is the process of diagnosing the source of a problem observed in the system. The technique described herein provides a way to determine a set of ranked fault cause paths within a particular host system. A fault cause path is a series of causes and effects starting with the root cause of the problem and explaining all the intermediate failures leading to the problem being diagnosed. Multiple fault cause paths may be identified for the same problem, and the multiple fault cause paths may be ranked in order of their probability of accurately reflecting how or why the problem occurred. The highest ranked fault cause path may be referred to as the most probable fault cause path.

To generate a fault cause path, a path is traced through the Bayesian network starting at a root cause node and traversing directional links to other fault nodes until the symptom node is reached. Thus, the traversal through the Bayesian network to identify a fault cause path starts with a root cause node and ends at the symptom node. This path provides an explanation as to the sequence of events that caused the failure and may provide some insight as to how to fix the problem or prevent similar problems from occurring in the future. As the Bayesian network is a probabilistic model, the fault cause paths are extracted based on the probabilities of failure associated with each fault node, and the most probable explanations can be provided to an administrator or operator of the system with an indication of the likelihood of the accuracy of each explanation.

Figure 9:
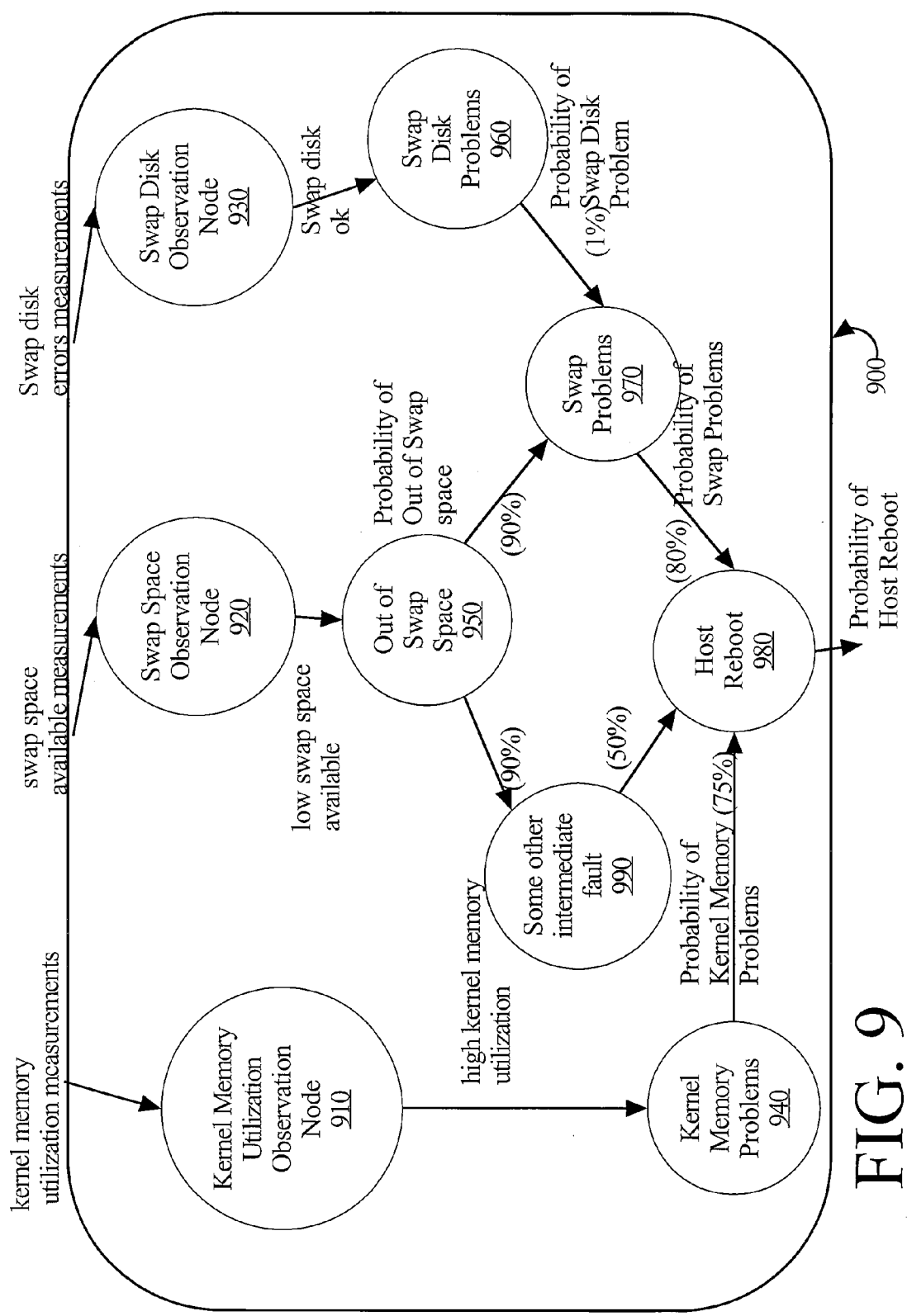
FIG. 9 is an example Bayesian Network according to an embodiment of the present invention.

FIG. 9 shows a subset of a Bayesian Network for the purpose of explaining root cause analysis. The Bayesian network shown in FIG. 9 reflects historical data in which a host system has rebooted, and the cause of the reboot is under investigation. Thus, the example shows using the diagnostic system offline for post-mortem analysis. If this technique were used in a running system, root cause analysis would not be invoked until Host Reboot 980 emitted a probability of failure that exceeded a threshold as described above. Observation Nodes Kernel Memory Utilization Observation Node 910 converts the kernel memory utilization measurements into a state of kernel memory utilization. Swap Space Observation Node 920 converts the available swap space measurement into a low swap space available state. The Swap Disk Observation Node 930 converts the swap disk errors measurements in a swap disk state. According to the state of the system at the time of the reboot, there was high memory utilization, low swap space available, and the state of the swap disk was ok.

Figure 8A:
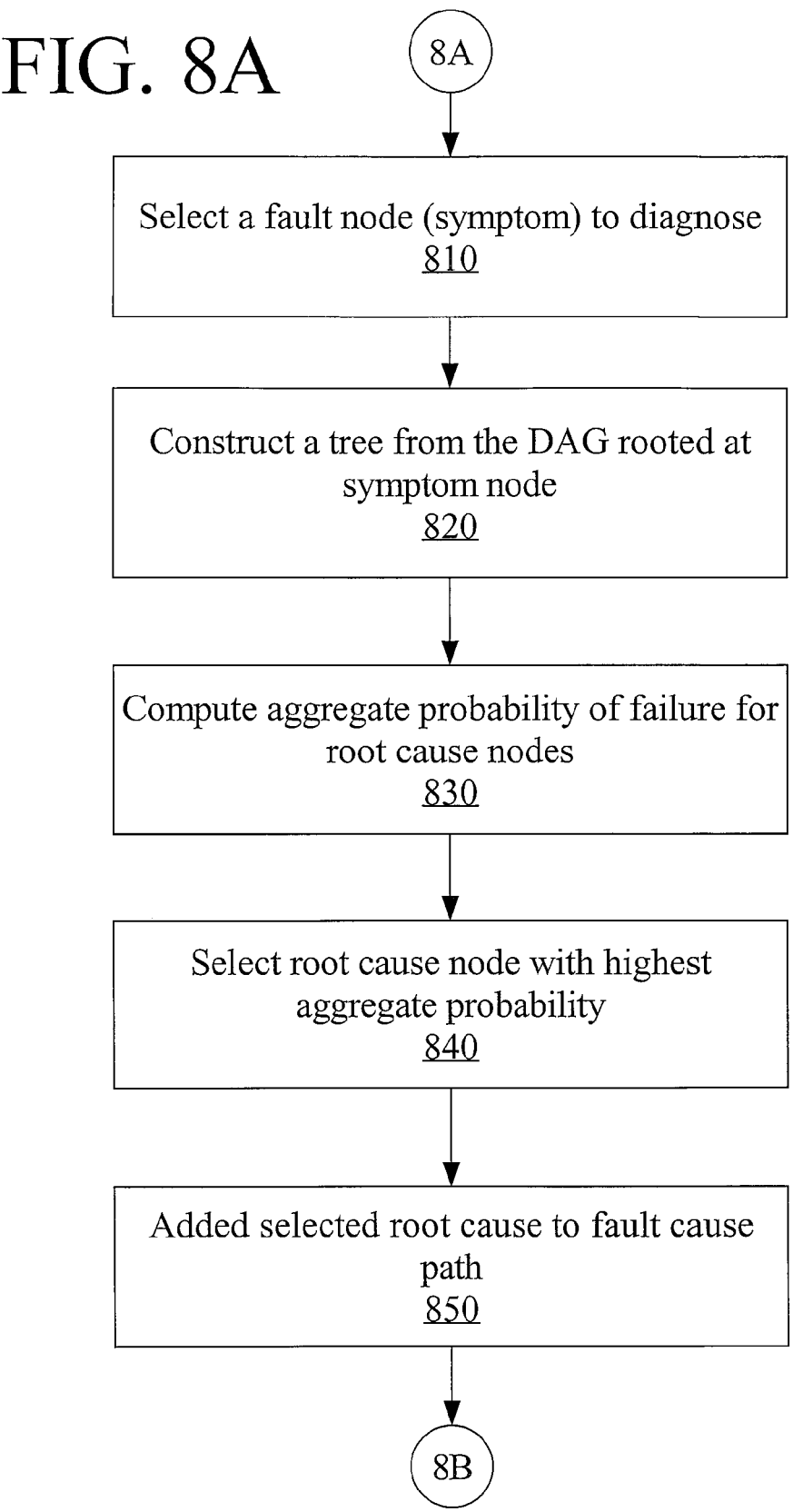
FIGS. 8A and 8B are flow diagrams showing the steps for performing root cause analysis within one host according to an embodiment of the present invention.
Figure 8B:
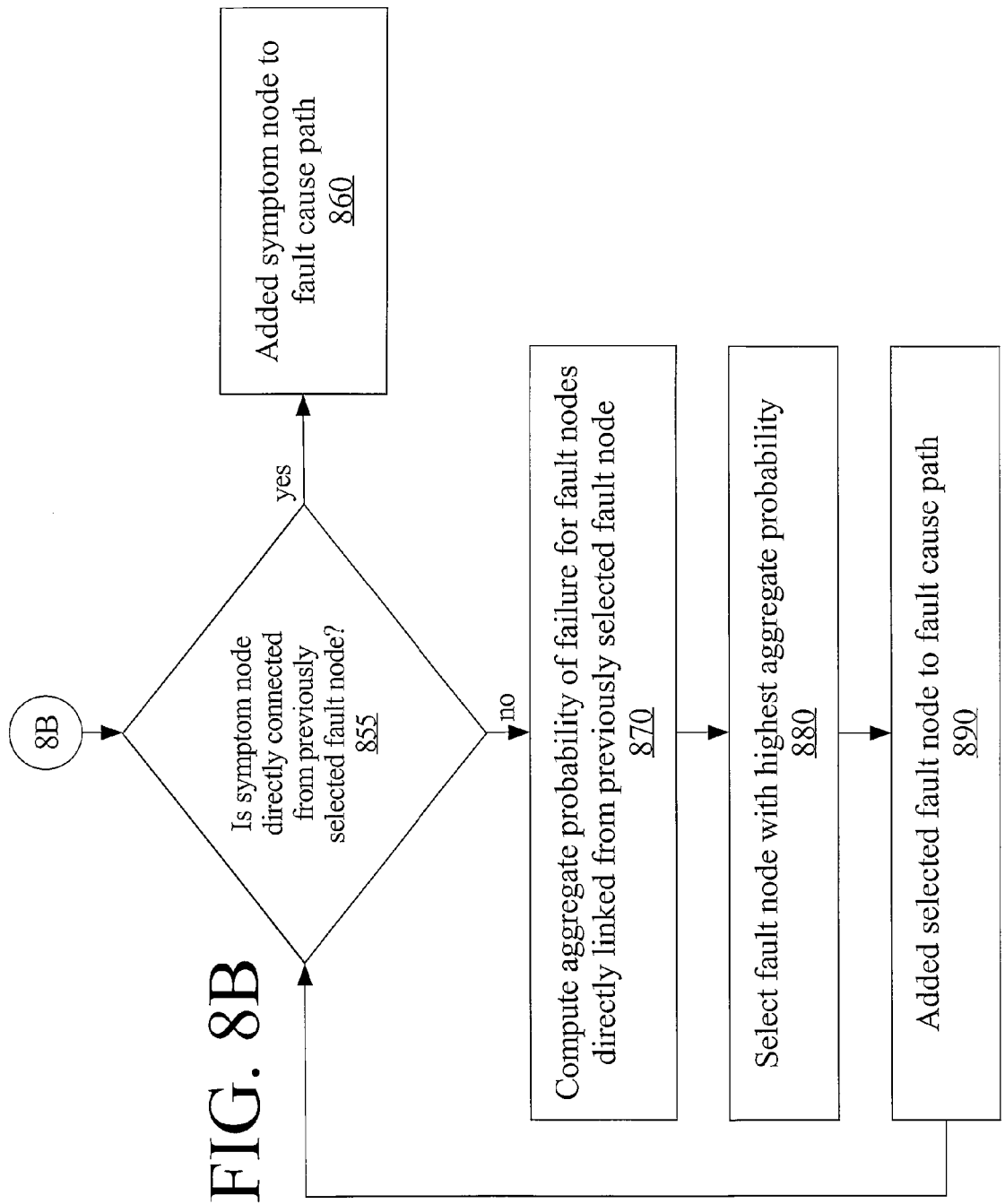

The steps for performing root cause analysis are shown in FIG. 8A and FIG. 8B. In Step 810, a fault node is selected as the symptom node for diagnosis. If there is a node in the network that represents the overall health of the system, the node representing the overall health may be selected as the symptom node. Alternatively, if a particular problem is known to the system administrator, the fault node associated with that particular problem may be selected as the symptom node for diagnosis. The most probable fault cause path can be generated from any fault node within the Bayesian network. In the example shown in FIG. 9, the symptom node is Host Reboot 980.

In a large complex DAG that represents causes and effects of failures in a complex host system, distinguishing root cause nodes from other fault nodes in may be difficult. In step 820, a tree may be constructed from the DAG with the selected symptom node as the root of the tree. Only those nodes from the DAG that have a path to the selected symptom node are represented in the tree because only those nodes may be represented in a fault cause path. Once the tree is constructed, root cause nodes are easily identifiable because the root cause nodes are leaf nodes in the tree. In another embodiment, the root cause nodes may be identified based on the DAG without first creating a tree.

In Step 830, the aggregate probability of failure is computed for each of the root cause nodes. The aggregate probability of failure for each root cause node is computed using an aggregation function over a historical window of probability values that were computed based on recent past evidence. For example, if failure probabilities are computed once per second and the size of the historical window is 4, then the failure probabilities calculated over the last 4 seconds are aggregated, and the result of the aggregation function is used as the aggregate probability of failure for the root cause node in the current time period. In FIG. 9, the root cause nodes are Kernel Memory Problems 940, Out of Swap Space 950, and Swap Disk Problems 960. The probabilities annotated on the direction link for each fault node indicate the aggregated probability within the current time sliding window. The Kernel Memory Problems 940 fault node indicates that there is a 75% probability of a kernel memory failure in the host system, the Out of Swap Space 950 fault node indicates that there is a 90% probability of a kernel memory problem, and the Swap Disk Problems 960 indicates that the probability of a swap disc problem is 1%.

Figure 10:
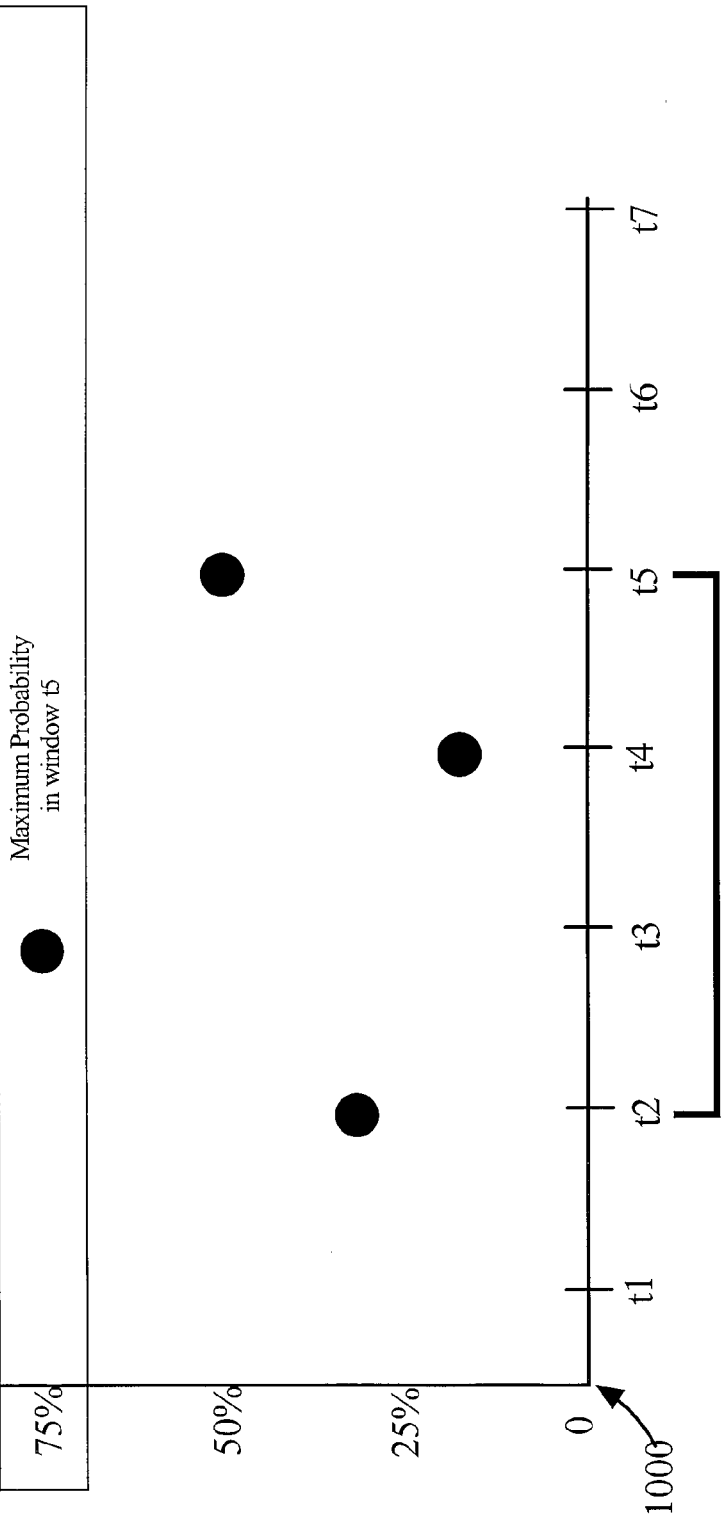
FIG. 10 shows an example of determining an aggregated probability of failure for a node in the Bayesian network over a historical time window according to an embodiment of the present invention.

In an embodiment, the aggregation function computed over the historical time sliding window for the purpose of generating a fault cause path is to take the maximum probability value in the window. FIG. 10 shows an example of how the aggregated probability for Kernel Memory Problems 940 was determined to be 75% at the current time of t5. The example time sliding window 1000 contains four probability data points: 30%, 75%, 15%, and 50%. 75% is the maximum data value among the values in the window, and therefore, is selected as the aggregated probability for that time window, even though 75% corresponds to the probability of failure back at time t3.

In Step 840, the root cause node having the highest (maximum) aggregate probability of failure is selected as the highest ranked root cause. In Step 850, the root cause is added to the fault cause path. In the example, the maximum aggregate probability among {75%, 90%, and 1%} is 90% corresponding to Out of Swap Space 950. Thus, Out of Swap Space 950 is determined to be the most probable root cause of Host Reboot 980.

The flow continues in FIG. 8B. The set of fault nodes that can be caused by the root cause are examined. In the example, the only node caused by Out of Swap Space 950 causes Swap Problems 970 and Some Other Intermediate Fault 990. In Step 855, a determination is made as to whether the symptom node is in the set of fault nodes under examination. If so, the path from root cause to symptom node is complete, and the symptom node is added to the fault cause path at Step 860. If the symptom node is not included in the set of fault nodes that can be directly caused by the latest fault node represented in the fault cause path, then the same process is followed for the current set of fault nodes under examination as was performed on the root cause nodes. In the example, the symptom node Host Reboot 980 is not in the set of nodes that can be directly caused by Out of Swap Space 950, so the flow continues to Step 870.

In Step 870, an aggregate probability is computed for each of the fault nodes under examination. The aggregate probability of failure for Some Other Intermediate Fault Node 990 is 50%, and the aggregate probability of failure for Swap Problems 970 is 80

In Step 880, the fault node with the highest aggregate probability is selected. Thus, Swap Problems 970 is selected as the next failure in the fault cause path. In Step 890, the fault node with the highest aggregate probability of failure is added to the fault cause path. The flow repeats, considering intermediate fault nodes in the DAG until the symptom node is reached. In the example, Swap Problems 970 causes the symptom node, and there is no other path to the symptom node. Thus, the symptom is added to the fault cause path, and the analysis is done. The generated fault cause path is:

Out of Swap Space→Swap Problems→Host Reboot

In an embodiment, once a complete fault path is determined, the system may repeat the process starting with a different root cause having the next highest aggregate probability of failure to generate additional possible, but less likely, explanations of failure. In an embodiment, explanations for all root causes in the model are shown to the user with an indication of their ranking and probability of correctness. In another embodiment, a configurable number of explanations based on the highest ranked root causes is shown to the user. In yet another embodiment, only the root cause explanations having an aggregate probability greater than a threshold are displayed to the user.

Cross Host Diagnosis

In a complex multi-host system, it may be especially difficult to diagnose problems not only because components within a host may cause failure, but also because failures within hosts within the multi-host system may impact the proper operation of each other. In other words, a failure in one host may cause a problem for other hosts, even if none of the observations on the failing host indicate a problem. Thus, it may be necessary to expand the scope of root cause analysis to other hosts in the system.

Figure 11:
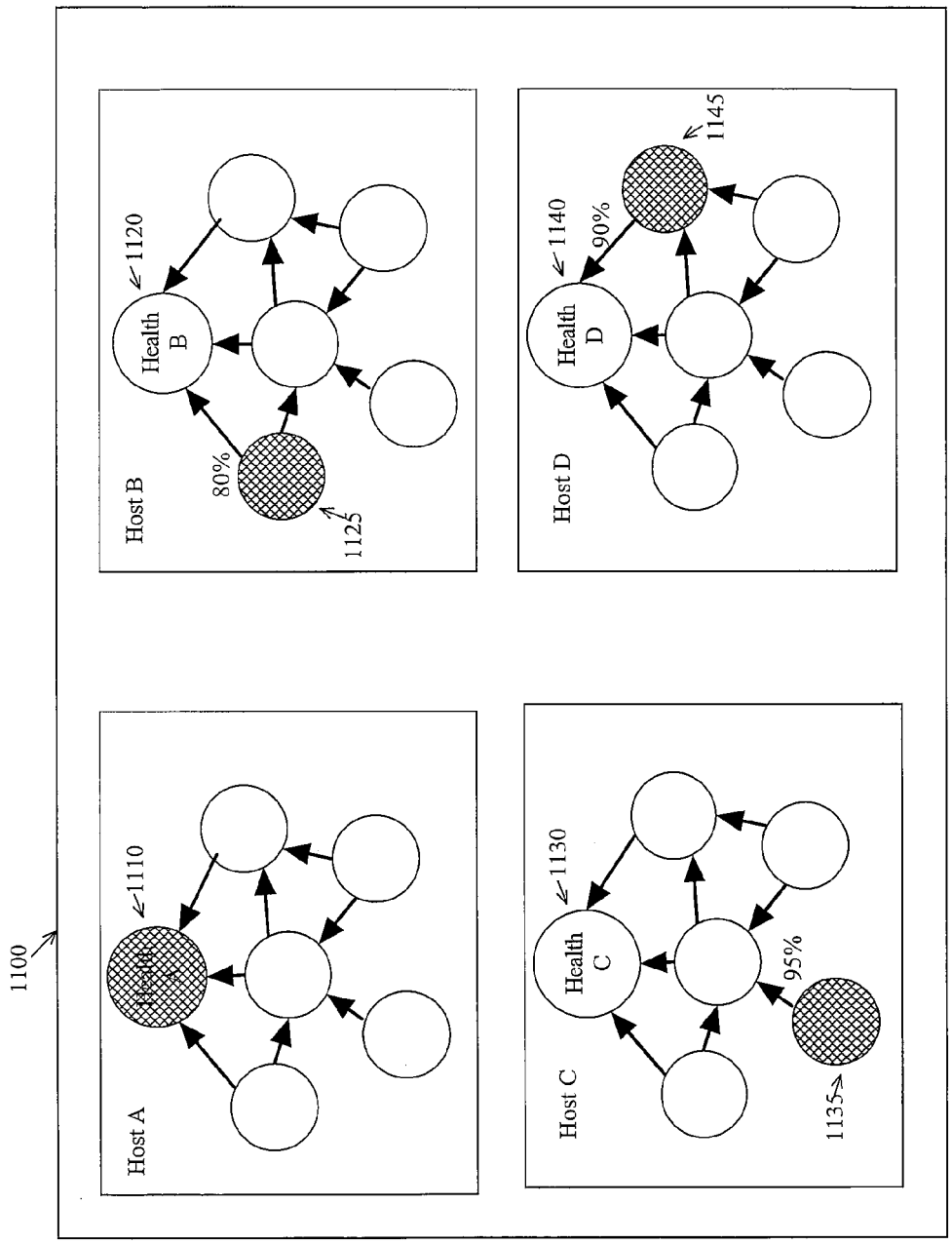
FIG. 11 is a diagram of a multi-host system with 4 hosts, each with its own Bayesian network for tracking state and diagnosing failures within the host.
Figure 12:
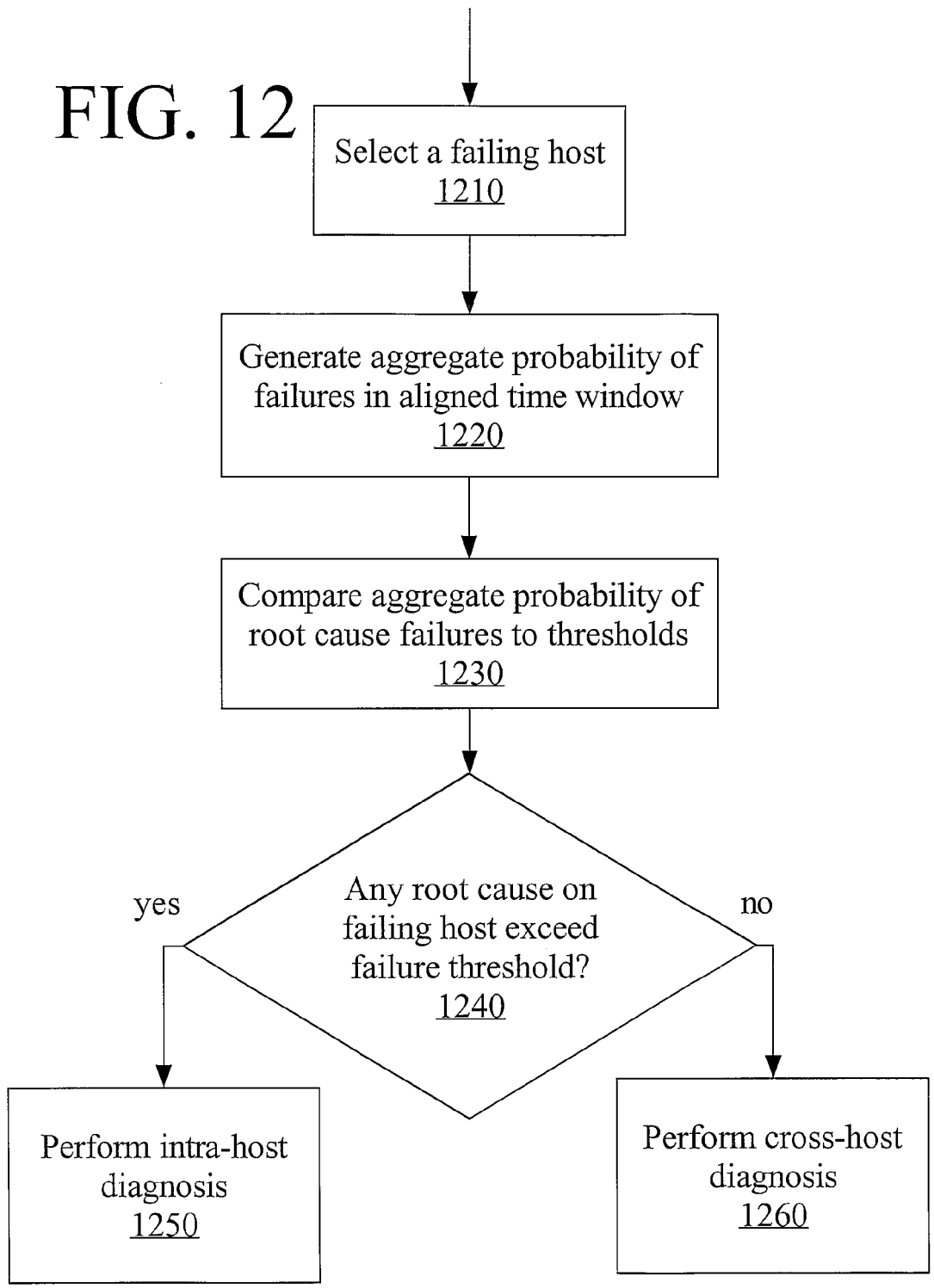
FIG. 12 is a flow diagram that shows the steps needed to determine whether to perform intra- or cross-host diagnosis according to an embodiment of the present invention.

FIG. 11 shows an example of an embodiment in which a multi-host system 1100 having 4 hosts A, B, C, and D, each with their own respective Bayesian networks, and each having an overall health node to represent the health of the host it represents. In the example, nodes that are shaded with a cross-hatch pattern are nodes for which the aggregate probability of failure exceeds its threshold. Thus, the overall health node representing Host A (i.e. Health A 1110) indicates that Host A is experiencing a problem. FIG. 12 is a flow diagram that shows the steps needed to determine whether to perform intra- or cross-host diagnosis. At Step 1210, a host within the multi-host system is selected as having a problem. In the example in FIG. 11, Host A is selected for diagnosis.

In Step 1220, the aggregate probabilities of failure are determined for all or certain fault nodes in all of the Bayesian networks. The time window used for each node is aligned with time window of the failing host. The clocks are expected to be synchronized across hosts in the multi-host system. The time window used for analyzing data on each host other than the failing host is aligned to the time of the latest system measurement on that host that occurred before the time of the failure. The length of the time window used on one host is selected to be long enough to allow a failure on that host to cause an observable problem on the failing host. The length of the time window may be the same on every host, or the window size may be configured to different lengths because different hosts have different failure propagation times.

TABLE 2

Timeline of host system measurements.

| Host | Time of data collection relative to synchronized clock (HH:MM:SS) |
|---|---|
| B | 1:00:01 |
| C | 1:00:05 |
| A | 1:00:06 |
| B | 1:00:07 |
| C | 1:00:10 |
| A | Failure detected at 1:00:12 |

Table 2 is a timeline of measurement events across hosts in the multi-host system. Table 2 shows that Host B collected measurements at times 1:00:01 and 1:00:07 and Host C collected measurements at times 1:00:05 and 1:00:10. When a failure at 1:00:12 is detected on Host A, an historical analysis time window is established for Hosts B and C ending at the most recent data collection before the failure. That is, for Host B, the time window may end at 1:00:07 and for Host C, the time window may end at 1:00:10. Thus, if the length of the time window for both hosts were 10 minutes, then analysis of the probability of failures on Host B would be conducted on measurements collected between [00:50:07 and 1:00:07], and between [00:50:10 and 1:00:10] for measurements collected on Host C.

In Step 1230, the aggregate probability of failure for each of the root cause nodes in Host A are compared to their respective threshold to determine if there is a root cause explanation within Host A. Host A has no root cause nodes with a probability of failure exceeding a threshold.

The steps for performing cross-host root cause analysis are different from intra-host root cause analysis regarding the set of fault nodes to analyze for failures. When performing intra-host root cause analysis, the assumption is that the failure is caused within the failing host, and thus, the root cause node with the highest probability of failure can be used, even if the highest probability doesn't exceed a threshold, because the best explanation still depends on the highest probability of failure. When performing cross-host root cause analysis, the failure may be caused by nodes on any of the hosts. In that case, the decision to analyze fault nodes on other hosts other than the failing hosts requires determining whether any of the root cause nodes on the failing host exceed a failure threshold value. If not, then failures on other hosts are also considered when looking for the best explanation of failure.

In Step 1240, a determination is made as to whether any of the root cause nodes on the failing host exceed their failure threshold. If at least one aggregate probability of failure exceeds its threshold value, then in Step 1250, intra-host root cause diagnosis takes place as explained above. However, if none of the root cause nodes' aggregate probability of failure exceeds its threshold, then in Step 1260, a failure on another host is suspected, and cross-host diagnosis is performed as shown in FIG. 13.

In another embodiment, intra-host root cause analysis may be performed based on intermediate fault nodes rather than only examining root cause nodes. In an embodiment, all fault nodes including intermediate nodes of the failing host's Bayesian network may be analyzed to determine if there is a probability of failure that exceeds a threshold. The fault node with the highest probability of failure may be selected as the starting point for diagnosis. Alternatively, an intermediate fault node may only be selected as the starting point for diagnosis if there is no root cause node whose probability of failure exceeds the threshold.

If an intermediate node is selected as the starting point for diagnosis, then a fault cause path may be generated in two parts: The first part is the result of performing intra-host root cause analysis with the intermediate node as the symptom node, forming a fault cause path between a root cause node and the symptom node. The second part is the result of performing intra-host root cause analysis treating the intermediate node as though it were a root cause node and finding a fault cause path to the overall health node.

Figure 13:
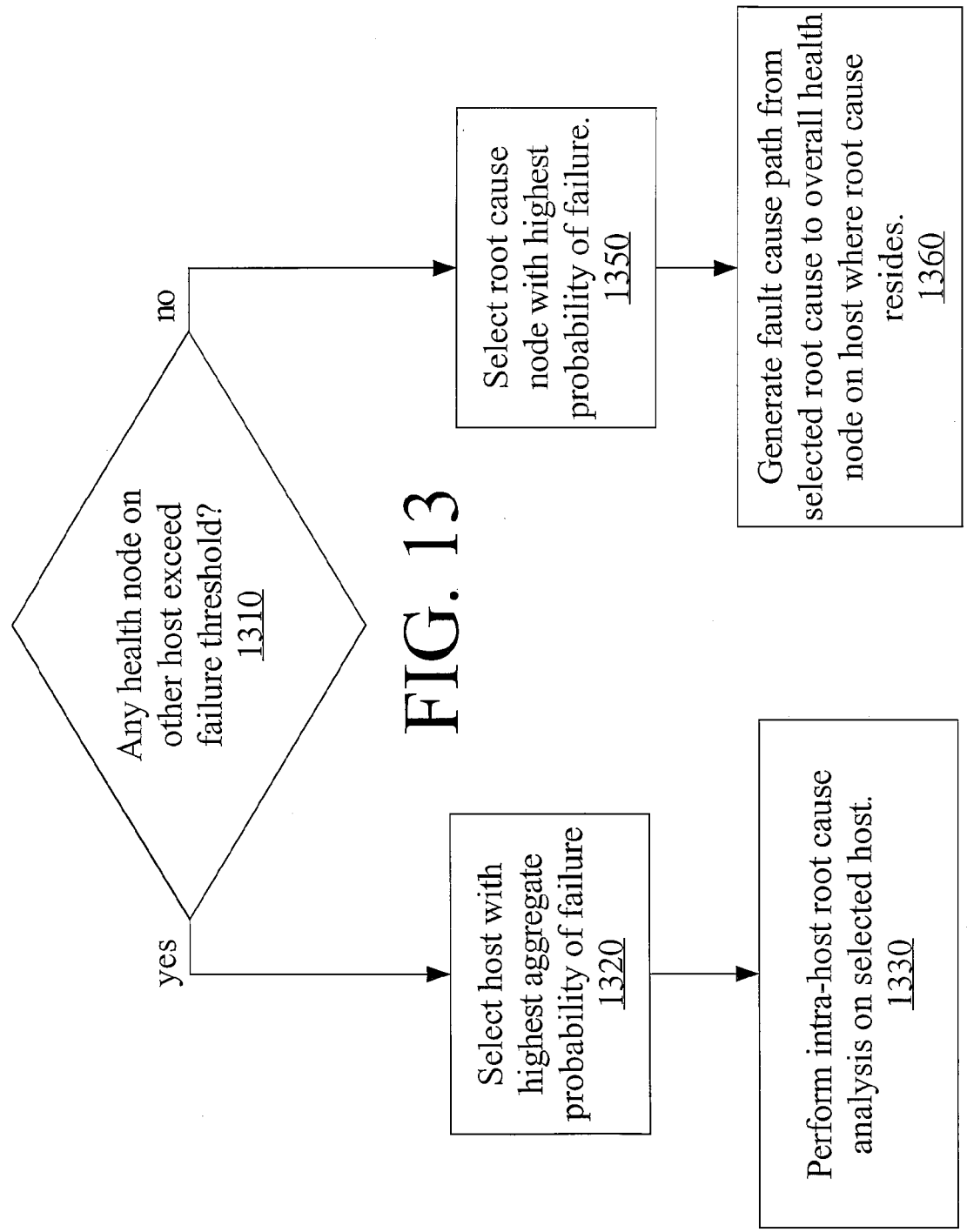
FIG. 13 is a flow diagram that shows the steps for cross-host diagnosis according to an embodiment of the present invention.

FIG. 13 is a flow diagram showing the steps for performing cross-host root cause analysis. In Step 1310, the probabilities of failure associated with each of the overall health nodes for each host are inspected. If there is a host with an overall health node indicating a probability of failure greater than its threshold, then in Step 1320, the host with the highest probability of failure is selected, and intra-host root cause diagnosis is performed on the selected host using the overall health node for that host as the symptom node (Step 1330).

If none of the fault nodes representing overall health of a host exceed its respective threshold (as is shown in FIG. 11), then in Step 1350, the root cause nodes across all hosts whose probability of failure exceeds their corresponding threshold are identified and compared to each other. The root cause node with the highest probability of failure is selected. In FIG. 11, only root cause nodes 1135 on Host C and 1125 on Host B exceed their probability of failure. Although 1145 has a probability of failure that exceeds the threshold, 1145 is not a root cause node. The probabilities of failure for 1135 and 1125 are compared (95% vs. 80% respectively), and 1135 is selected as the most probable root cause.

In Step 1360, intra-host root cause analysis is performed on the host on which the selected root cause node resides, using the overall health node of that host as the symptom node. In the example, a fault cause path would be generated between root cause 1135 and node Health C 1130 on Host C.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
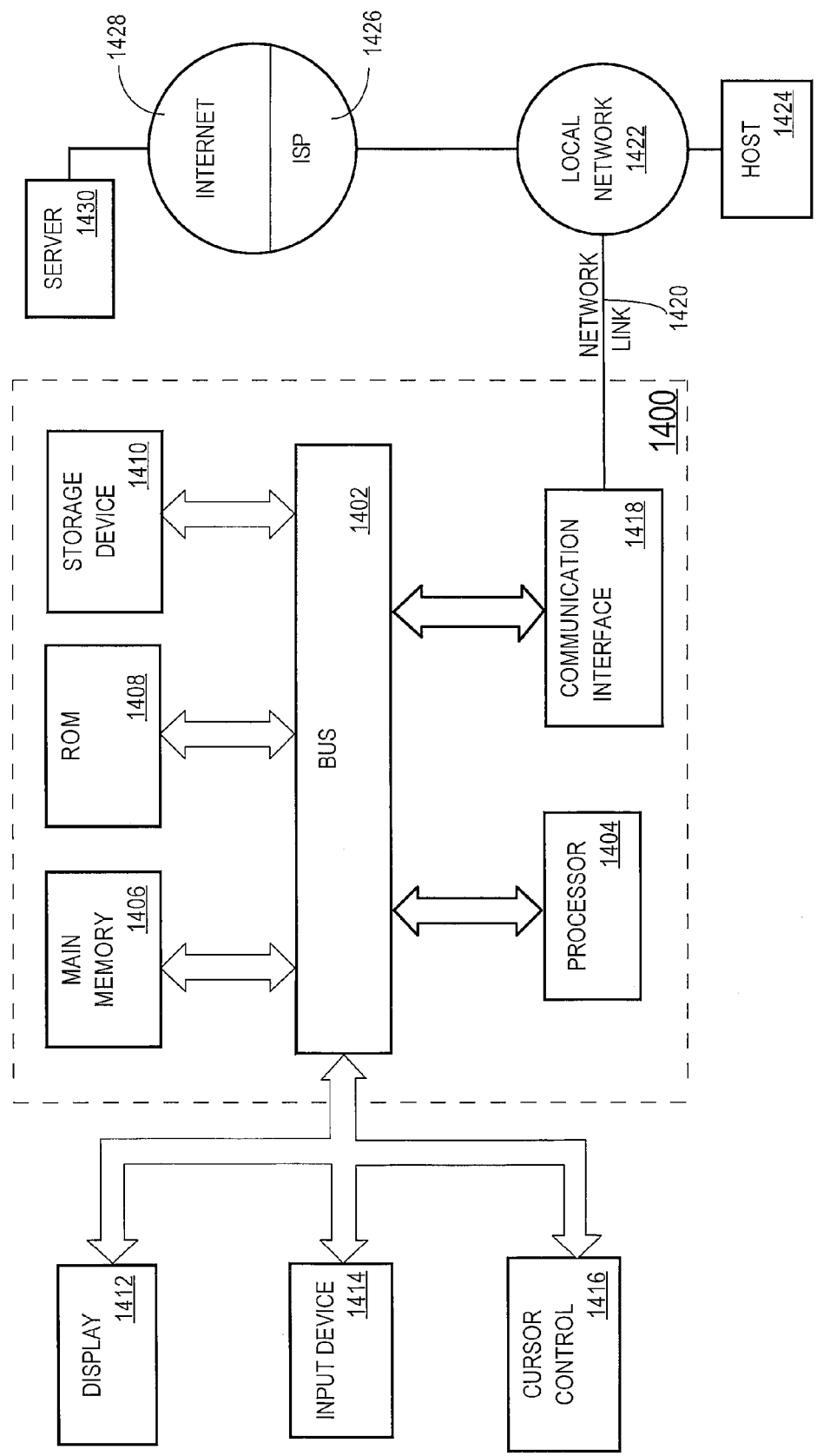
FIG. 14 is a block diagram that illustrates a computer system upon which an embodiment in accordance with the present invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to an embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising steps of:
  receiving a set of system measurement values periodically over time, wherein each system measurement value of the set of system measurement values is a value for a particular system measure of a set of system measures;
  wherein each system measurement value of the set of system measurement values is taken at a measurement time point within a time interval associated with the particular system measure;

wherein the time interval includes a plurality of recent successive measurement time points;

identifying a particular set of system measurement values that were taken at measurement time points included in the time interval;

determining a count of system measurement values of the particular set of system measurement values, wherein a system measurement value is counted if said system measurement value exceeds a threshold value wherein the particular system measure is associated with the threshold value and a number of measurement time points included in the time interval;

determining a system measure state for the particular system measure based on the count of system measurement values, wherein the system measure state of the particular system measure is provided to a probabilistic model, wherein the probabilistic model determines a probability of a failure value based on the system measure state of the particular system measure in a complex multi-host system;

wherein each step is performed by one or more computing devices.

2. The method of claim 1, wherein a first count is determined for a first set of measurement values taken within a first time interval for a system measure, wherein the steps further include:

determining a first system measure state for the system measure based on the first count;

a probabilistic model determining a probability of failure value based on the first system measure state;

receiving a second set of system measurement values periodically over time, wherein each system measurement value of the second set of system measurement values is a value for said system measure;

wherein each system measurement value of the second set of system measurement values is taken at a measurement time point within a second time interval associated with said system measure;

determining a second count for the second set of measurement values taken within the second time interval for said system measure;

determining a second system measure state for said system measure based on the second count;

in response to determining that the second system measure state is different from the first system measure state, the probabilistic model determining a second probability of failure value based on the second system measure state.

3. The method of claim 2, wherein there is at least one measurement time point that is included in both the first time interval and the second time interval, wherein the oldest time point included in the first time interval is not included in the second time interval, and the newest time point in the second interval is not included in the first time interval; and wherein there is a plurality of system measurement values that correspond to the plurality of measurement time points, wherein each system measurement value of the plurality of system measurement values corresponds to a measurement time point of the plurality of measurement time points; and wherein both the first system measure state and the second system measure state are based at least in part on a count of system measurement values in the plurality of system measurement values, wherein a system measurement value in the plurality of system measurement values is counted if it exceeds a threshold value associated with said system measure.

4. The method of claim 1, wherein:

the probabilistic model is a Bayesian network;

an observation node of the Bayesian network performs determining the count of system measurement values of the particular set of system measurement values, wherein the system measurement value is counted if it exceeds the threshold value; and wherein the steps further include determining the system measure state for the particular system measure is performed by the observation node mapping the count of system measurement values to the system measure state for the particular system measure.

5. The method of claim 4, wherein the system measure state is provided as input into a root cause node in the Bayesian network; and the root cause node maps the system measure state to a probability of failure value associated with the root cause node.

6. A non-transitory computer-readable storage medium storing one or more sequences of instructions, said one or more sequences of instructions, which, when executed by one or more processors, causes the one or more processors to perform steps of:

receiving a set of system measurement values periodically over time, wherein each system measurement value of the set of system measurement values is a value for a particular system measure of a set of system measures;

wherein each system measurement value of the set of system measurement values is taken at a measurement time point within a time interval associated with the particular system measure;

wherein the time interval includes a plurality of recent successive measurement time points;

identifying a particular set of system measurement values that were taken at measurement time points included in the time interval;

determining a count of system measurement values of the particular set of system measurement values, wherein a system measurement value is counted if said system measurement value exceeds a threshold value wherein the particular system measure is associated with the threshold value and a number of measurement time points included in the time interval;

determining a system measure state for the particular system measure based on the count of system measurement values, wherein the system measure state of the particular system measure is provided to a probabilistic model, wherein the probabilistic model determines a probability of a failure value based on the system measure state of the particular system measure in a complex multi-host system;

wherein each step is performed by one or more computing devices.

7. The non-transitory computer-readable storage medium of claim 6, wherein a first count is determined for a first set of measurement values taken within a first time interval for a system measure, wherein the steps further include:

determining a first system measure state for the system measure based on the first count;

a probabilistic model determining a probability of failure value based on the first system measure state;

receiving a second set of system measurement values periodically over time, wherein each system measurement value of the second set of system measurement values is a value for said system measure;

wherein each system measurement value of the second set of system measurement values is taken at a measurement time point within a second time interval associated with said system measure;

determining a second count for the second set of measurement values taken within the second time interval for said system measure;

determining a second system measure state for said system measure based on the second count;

in response to determining that the second system measure state is different from the first system measure state, the probabilistic model determining a second probability of failure value based on the second system measure state.

8. The non-transitory computer-readable storage medium of claim 7, wherein there is at least one measurement time point that is included in both the first time interval and the second time interval, wherein the oldest time point included in the first time interval is not included in the second time interval, and the newest time point in the second interval is not included in the first time interval; and wherein there is a plurality of system measurement values that correspond to the plurality of measurement time points, wherein each system measurement value of the plurality of system measurement values corresponds to a measurement time point of the plurality of measurement time points; and wherein both the first system measure state and the second system measure state are based at least in part on a count of system measurement values in the plurality of system measurement values, wherein a system measurement value in the plurality of system measurement values is counted if it exceeds a threshold value associated with said system measure.

9. The non-transitory computer-readable storage medium of claim 6, wherein:

the probabilistic model is a Bayesian network;

an observation node of the Bayesian network performs determining the count of system measurement values of the particular set of system measurement values, wherein the system measurement value is counted if it exceeds the threshold value; and wherein the steps further include determining the system measure state for the particular system measure is performed by the observation node mapping the count of system measurement values to the system measure state for the particular system measure.

10. The non-transitory computer-readable storage medium of claim 9, wherein the system measure state is provided as input into a root cause node in the Bayesian network; and the root cause node maps the system measure state to a probability of failure value associated with the root cause node.

11. A multi-host computing system, wherein said multi-host computing system is configured to:

to generate a set of system measurement values periodically over time, wherein each system measurement value of the set of system measurement values is a value for particular system measure of a set of system measures;

wherein each system measurement value of the set of system measurement values is taken at a measurement time point within a time interval associated with the particular system measure;

wherein the time interval includes a plurality of recent successive measurement time points;

to identify a particular set of system measurement values that were taken at measurement time points included in the time interval;

to determine a count of system measurement values of the particular set of system measurement values, wherein a system measurement value is counted if said system measurement value exceeds a threshold value;

wherein the particular system measure is associated with the threshold value and a number of measurement time points included in the time interval; and to determine a system measure state for the particular system measure based on the count of system measurement values, wherein the system measure state of the particular system measure is provided to a probabilistic model, wherein the probabilistic model determines a probability of a failure value based on the system measure state of the particular system measure in a complex multi-host system.

12. The multi-host computing system of claim 11, the multi-host computing system being further configured to:

to determine a first system measure state for the system measure based on the first count;

to use a probabilistic model to determine a probability of failure value based on the first system measure state;

to receive a second set of system measurement values periodically over time, wherein each system measurement value of the second set of system measurement values is a value for said system measure;

wherein each system measurement value of the second set of system measurement values is taken at a measurement time point within a second time interval associated with said system measure;

to determine a second count for the second set of measurement values taken within the second time interval for said system measure;

to determine a second system measure state for said system measure based on the second count; and to use the probabilistic model to determine a second probability of failure value based on the second system measure state, in response to determining that the second system measure state is different from the first system measure state.

13. The multi-host computing system of claim 11, wherein the oldest time point included in the first time interval is not included in the second time interval, and the newest time point in the second interval is not included in the first time interval; and wherein there is a plurality of system measurement values that correspond to the plurality of measurement time points, wherein each system measurement value of the plurality of system measurement values corresponds to a measurement time point of the plurality of measurement time points; and wherein both the first system measure state and the second system measure state are based at least in part on a count of system measurement values in the plurality of system measurement values, wherein a system measurement value in the plurality of system measurement values is counted if it exceeds a threshold value associated with said system measure.

14. The multi-host computing system of claim 11, wherein:

the probabilistic model is a Bayesian network;

an observation node of the Bayesian network is configured to determine the count of system measurement values of the particular set of system measurement values, wherein the system measurement value is counted if it exceeds the threshold value; and wherein the observation node is configured to map the count of system measurement values to the system measure state for the particular system measure to determine the system measure state for the particular system measure.

15. The multi-host computing system of claim 11, wherein the system measure state is provided as input into a root cause node in the Bayesian network; and the root cause node maps the system measure state to a probability of failure value associated with the root cause node.

* * * * *

UNITED STATES PATENT AND TRADEMARK OFFICE
CERTIFICATE OF CORRECTION

| | | |
|---|---|---|
| PATENT NO. | : 8,230,262 B2 | |
| APPLICATION NO. | : 12/830175 | |
| DATED | : July 24, 2012 | |
| INVENTOR(S) | : Li et al. | |

It is certified that error appears in the above-identified patent and that said Letters Patent is hereby corrected as shown below:

In column 12, line 5, after "80" insert -- . --.

In column 19, line 62, in Claim 11, delete "for" and insert -- for a --, therefor.

Signed and Sealed this
Twenty-third Day of October, 2012

David J. Kappos
*Director of the United States Patent and Trademark Office*